US009248923B2

(12) United States Patent
Pinney et al.

(10) Patent No.: US 9,248,923 B2
(45) Date of Patent: Feb. 2, 2016

(54) CERAMIC COMPOSITE THERMAL PROTECTION SYSTEM

(71) Applicant: The Boeing Company, Chicago, IL (US)

(72) Inventors: Thomas R. Pinney, Huntington Beach, CA (US); Conley Siddoway Thatcher, Placentia, CA (US); Jonathan Embler, Huntington Beach, CA (US); Kaia Elena David, La Habra Heights, CA (US); Leanne L. Lehman, Aliso Viejo, CA (US); Edward A. Zadorozny, Redondo Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/289,609

(22) Filed: May 28, 2014

(65) Prior Publication Data

US 2014/0377510 A1    Dec. 25, 2014

Related U.S. Application Data

(62) Division of application No. 12/352,235, filed on Jan. 12, 2009, now Pat. No. 8,752,350.

(51) Int. Cl.
*B64G 1/58*    (2006.01)
*B64G 1/62*    (2006.01)

(52) U.S. Cl.
CPC .. *B64G 1/58* (2013.01); *B64G 1/62* (2013.01); *Y10T 29/49947* (2015.01); *Y10T 428/24322* (2015.01); *Y10T 428/24777* (2015.01)

(58) Field of Classification Search
CPC .............. B64G 1/58; B64G 1/62; B64C 1/40; B64C 1/403; Y10T 428/24777; Y10T 428/24322; Y10T 428/24008; Y10T 29/49947; E04F 13/12; E04F 13/123; E04F 13/0826; E04F 13/0889; E04F 13/0814; E04F 13/0846; E04F 13/14; E04B 2/7425; E04B 2001/2415
USPC .......... 52/407.4, 407.2, 404.2, 700, 702, 709, 52/718.05, 718.04, 582.1, 584.1, 586.1, 52/586.2, 585.1, 741.3, 745.05, 745.06, 52/745.13, 747.1, 404.1; 428/137, 163, 428/167, 192; 29/525.01; 244/159.1, 171.7
See application file for complete search history.

(56) References Cited

U.S. PATENT DOCUMENTS 1,913,290 A *  6/1933  Rockwell .................... 52/396.1
3,233,935 A *  2/1966  Brindle ........................ 296/168

(Continued)

OTHER PUBLICATIONS

Office Action, dated Dec. 30, 2011, regarding U.S. Appl. No. 12/352,235, 17 pages.

(Continued)

*Primary Examiner* — Joshua J Michener
*Assistant Examiner* — Theodore Adamos
(74) *Attorney, Agent, or Firm* — Yee & Associates, P.C.

(57) ABSTRACT

An apparatus comprises a thermal protection element, a number of washers, a ceramic layer, a number of blind fasteners, and a number of tabs. The thermal protection element has an upper surface, a lower surface, and a plurality of sides. The ceramic layer covers at least the plurality of sides of the thermal protection element. The number of tabs is connected to the number of sides by the number of blind fasteners secured to the ceramic layers. The tabs may be part of a frame secured to a groove around the plurality of sides.

14 Claims, 13 Drawing Sheets

(56) References Cited

U.S. PATENT DOCUMENTS

| | | | | |
|---|---|---|---|---|
| 3,239,986 | A | * | 3/1966 | Russell .................. 52/584.1 |
| 3,570,205 | A | * | 3/1971 | Payne ...................... 52/466 |
| 3,919,825 | A | * | 11/1975 | Smith et al. ............... 52/745.13 |
| 3,975,879 | A | * | 8/1976 | Birch et al. ................. 376/290 |
| 4,107,887 | A | * | 8/1978 | Wendt ...................... 52/105 |
| 4,456,208 | A | | 6/1984 | MacConochie et al. |
| 4,730,428 | A | * | 3/1988 | Head et al. ................. 52/309.11 |
| 4,919,366 | A | * | 4/1990 | Cormier .................... 244/159.1 |
| 4,973,102 | A | | 11/1990 | Bien |
| 5,048,242 | A | * | 9/1991 | Cline ....................... 52/126.6 |
| 5,249,404 | A | | 10/1993 | Leek et al. |
| 5,265,396 | A | * | 11/1993 | Amimoto .................. 52/745.12 |
| 5,489,074 | A | * | 2/1996 | Arnold et al. .............. 244/159.1 |
| 5,547,628 | A | * | 8/1996 | Lacombe et al. ............ 264/621 |
| 5,626,951 | A | | 5/1997 | Hogenson |
| 5,702,761 | A | | 12/1997 | DiChiara, Jr. et al. |
| 5,803,406 | A | | 9/1998 | Kolodziej et al. |
| 5,928,775 | A | | 7/1999 | DiChiara, Jr. et al. |
| 5,979,130 | A | | 11/1999 | Gregg et al. |
| 6,007,026 | A | | 12/1999 | Shorey |
| 6,074,699 | A | | 6/2000 | DiChiara, Jr. et al. |
| 6,098,364 | A | * | 8/2000 | Liu ........................... 52/506.08 |
| 6,141,926 | A | * | 11/2000 | Rossiter et al. ............. 52/239 |
| 6,293,496 | B1 | * | 9/2001 | Moe ........................... 244/120 |
| 6,421,968 | B2 | | 7/2002 | Degelsegger |
| 6,494,979 | B1 | | 12/2002 | DiChiara, Jr. et al. |
| 6,505,794 | B2 | | 1/2003 | Myers et al. |
| 6,776,258 | B1 | | 8/2004 | Grosskrueger et al. |
| 6,866,733 | B1 | | 3/2005 | Denham et al. |
| 6,886,790 | B2 | | 5/2005 | Soyris |
| 6,919,103 | B2 | | 7/2005 | DiChiara, Jr. |
| 6,969,546 | B2 | | 11/2005 | DiChiara, Jr. |
| 7,621,091 | B2 | * | 11/2009 | Dickey et al. ............... 52/582.2 |
| 8,166,716 | B2 | * | 5/2012 | Macdonald et al. ........... 52/235 |
| 8,291,672 | B2 | * | 10/2012 | Hohmann, Jr. ....... E04B 1/4178 52/410 |
| 8,341,901 | B2 | * | 1/2013 | Loyd ............................ 52/235 |
| 8,468,765 | B1 | | 6/2013 | Kim |
| 8,752,350 | B2 | | 6/2014 | Pinney et al. |
| 2002/0078652 | A1 | * | 6/2002 | Hawkes ...................... 52/578 |
| 2003/0022783 | A1 | | 1/2003 | DiChiara, Jr. |
| 2005/0084665 | A1 | | 4/2005 | DiChiara, Jr. |
| 2005/0218565 | A1 | | 10/2005 | DiChiara, Jr. |
| 2009/0145071 | A1 | * | 6/2009 | Radford .................... 52/506.08 |
| 2010/0178457 | A1 | | 7/2010 | Pinney et al. |

OTHER PUBLICATIONS

Final Office Action, dated Jul. 13, 2012, regarding U.S. Appl. No. 12/352,235, 15 pages.

Office Action, dated Aug. 15, 2013, regarding U.S. Appl. No. 12/352,235, 14 pages.

Notice of Allowance, dated Feb. 12, 2014, regarding U.S. Appl. No. 12/352,235, 9 pages.

* cited by examiner

CERAMIC COMPOSITE THERMAL PROTECTION SYSTEM

This application is a divisional of application Ser. No. 12/352,235, filed Jan. 12, 2009, the entire contents of which are hereby incorporated by reference.

BACKGROUND INFORMATION

1. Field

The present disclosure relates generally to aerospace vehicles and, in particular, to a method and apparatus for attaching thermal protection systems to an aerospace vehicle.

2. Background

A spacecraft is a type of vehicle or device designed for space flight. When a spacecraft returns to earth, the spacecraft may encounter high temperatures on reentry. A thermal protection system may cover some or essentially all of a spacecraft. A thermal protection system may protect the spacecraft from temperatures that may reach around 1650 degrees Celsius during atmospheric reentry. Further, this thermal protection system also may be used to protect the spacecraft from heat and cold in space while in orbit.

A thermal protection system may have different materials in different locations of the spacecraft depending on the amount of heat protection needed. For example, reinforced carbon-carbon may be used in the nose or leading wing edges of a spacecraft, such as a space shuttle. High temperature reusable surface insulation tiles may be used on the underside of an aircraft. Flexible insulation blankets, low temperature reusable surface insulation tiles, and other materials may be used for different locations on the spacecraft. Each type of thermal protection system may have specific heat protection, impact resistance, and weight characteristics.

It is desirable to have a thermal protection system that requires little or no maintenance. Some components used by a thermal protection system may include modular components that may be quickly removed and replaced. For example, tiles are examples of components that may be used in a thermal protection system. A tile is a thermal protection system component that may be fabricated from ceramic and/or ceramic matrix composite materials. More specifically, a tile may have, for example, a ceramic substrate with a ceramic matrix composite layer wrapped around the core. In the event that a tile may need to be replaced, it is desirable to minimize the amount of time needed to replace tiles on a spacecraft. For example, a vehicle turnaround time of around 48 hours or as little as two hours may be desirable.

Thermal protection systems on existing spacecraft may be adhesively bonded or mechanically attached. With bonded thermal protection systems, the amount of time and cost associated with installation, inspection, and/or repair may be much greater than compared to a mechanically attached system. Further, bonded thermal protection systems are not necessarily removable without destroying a portion of the part. As a result, inspection of a spacecraft substructure and/or internal spacecraft subsystems may be time consuming and expensive. Another drawback of bonded thermal protection systems is the temperature limitations of the adhesive bond lines.

Mechanical attachments may include, for example, a standoff or a carrier panel. A standoff thermal protection system may include stiffened panels encapsulating a back face insulation that is mechanically attached through flanges or metallic standoffs. A carrier panel thermal protection system may have tiles and/or blankets bonded to metal or composite carrier panels that are mechanically attached to a structure.

With mechanically attached thermal protection systems, increased weight may occur, which is undesirable with space operation vehicles. In some cases, the weight of a carrier panel on which the tile is mounted for attachment to a structure may be a large percentage of the total weight of the thermal protection system.

Therefore, it would be advantageous to have a method and apparatus that takes into account one or more of the issues discussed above as well as possibly other issues.

SUMMARY

In one advantageous embodiment, an apparatus comprises a thermal protection element, a number of washers, a ceramic layer, a number of blind fasteners, and a number of tabs. The thermal protection element has an upper surface, a lower surface, and a plurality of sides. The ceramic layer covers at least the plurality of sides of the thermal protection element. The number of tabs is connected to the number of sides by the number of blind fasteners secured to the ceramic layer.

In another advantageous embodiment, an apparatus comprises a thermal protection element, a groove, and a frame. The thermal protection element has an upper surface, a lower surface, and a plurality of sides. The groove is formed in the plurality of sides of the thermal protection element. The frame has an inner edge and a number of tabs opposite of the inner edge. The inner edge of the frame is secured to the groove.

In yet another advantageous embodiment, a method is presented for securing a thermal protection element to a structure. A thermal protection element is positioned with respect to a number of fastener elements on a surface of a structure. The thermal protection element has a number of tabs secured to a number of sides on the thermal protection element with a number of blind fasteners. The number of blind fasteners is secured to a number of washers within a substrate of the thermal protection element. The number of tabs is secured to the number of fastening elements on the surface of the structure.

In still yet another advantageous embodiment, a method is presented for securing a thermal protection element to a structure. The thermal protection element is positioned with respect to a number of fastener elements on a surface of a structure. The thermal protection element has a groove formed in a plurality of sides of the thermal protection element and a frame having an inner edge and a number of tabs opposite of the inner edge. The inner edge of the frame is secured to the groove. The number of tabs is secured to the number of fastener elements on the surface of the structure.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
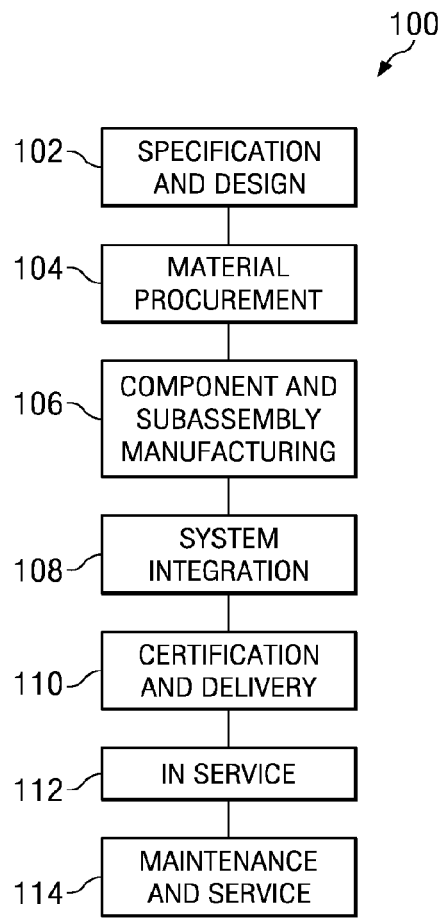
FIG. 1 is a diagram illustrating a spacecraft manufacturing and service method in accordance with an advantageous embodiment.
Figure 2:
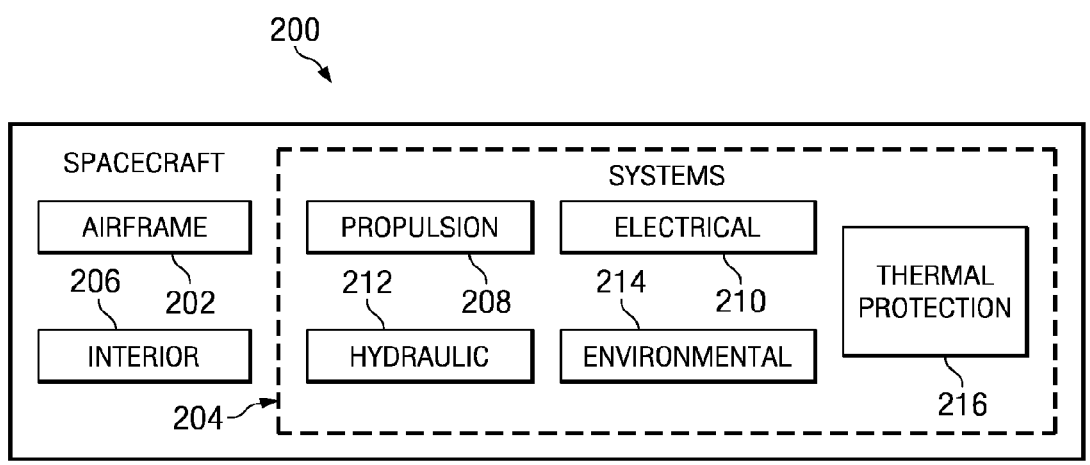
FIG. 2 is a diagram of a spacecraft in which an advantageous embodiment may be implemented.

Referring more particularly to the drawings, embodiments of the disclosure may be described in the context of spacecraft manufacturing and service method 100 as shown in FIG. 1 and spacecraft 200 as shown in FIG. 2. Turning first to FIG. 1, a diagram illustrating a spacecraft manufacturing and service method is depicted in accordance with an advantageous embodiment. During pre-production, exemplary spacecraft manufacturing and service method 100 may include specification and design 102 of spacecraft 200 in FIG. 2 and material procurement 104.

During production, component and subassembly manufacturing 106 and system integration 108 of spacecraft 200 in FIG. 2 takes place. Thereafter, spacecraft 200 in FIG. 2 may go through certification and delivery 110 in order to be placed in service 112. While in service by a customer, spacecraft 200 in FIG. 2 is scheduled for routine maintenance and service 114, which may include modification, reconfiguration, refurbishment, and other maintenance or service.

Each of the processes of spacecraft manufacturing and service method 100 may be performed or carried out by a system integrator, a third party, and/or an operator. In these examples, the operator may be a customer. For the purposes of this description, a system integrator may include, without limitation, any number of spacecraft manufacturers and major-system subcontractors; a third party may include, without limitation, any number of venders, subcontractors, and suppliers; and an operator may be a company, a military entity, a service organization, and so on.

With reference now to FIG. 2, a diagram of a spacecraft is depicted in which an advantageous embodiment may be implemented. In this illustrative example, spacecraft 200 is produced by spacecraft manufacturing and service method 100 in FIG. 1. Spacecraft 200 may include airframe 202 with a plurality of systems 204 and interior 206.

Examples of plurality of systems 204 include one or more of propulsion system 208, electrical system 210, hydraulic system 212, environmental system 214, and thermal protection system 216. At least some of the different advantageous embodiments may provide a method and apparatus for attaching thermal protection elements within thermal protection system 216 to spacecraft 200. Although an aerospace example is shown, different advantageous embodiments may be applied to other industries, such as the automotive industry.

One or more of the different advantageous embodiments recognize and take into account that it is desirable to have a mechanical system for attaching tiles for a thermal protection system to a vehicle structure that may have less weight. The different advantageous embodiments also take into account and recognize that it may be desirable to have a mechanical attachment system that may allow for quicker attachment and replacement of tiles.

The different advantageous embodiments also recognize and take into account that current systems use ceramic tiles that may have ceramic flanges that are fabricated as part of the tile. These ceramic tiles may include, for example, without limitation, ceramic matrix composite wrapped tiles. One or more of the different advantageous embodiments may recognize and take into account that these ceramic flanges formed on the tiles may be weaker in carrying loads in certain directions as compared to other directions.

Advantageous embodiments provide a method and apparatus having a thermal protection element with an upper surface, a lower surface, and a plurality of sides. A number of washers may or may not be located inside a substrate thermal protection element around a number of sides in the plurality of sides. A number of items, as used herein, refer to one or more items.

For example, a number of sides are one or more sides. Depending on the particular implementation, the number of sides may equal the plurality of sides. A ceramic layer covers at least the plurality of sides of the thermal protection element. A number of fasteners are used to connect the number of tabs to the number of sides. The fasteners may be secured to the number of washers through holes in the ceramic layer. These fasteners may take the form of blind fasteners in these illustrative examples.

In some advantageous embodiments, a method and apparatus may be present in which a thermal protection element has an upper surface, a lower surface, and a plurality of sides.

A groove may be formed in the plurality of sides of the thermal protection element. A frame having an inner edge and a number of tabs opposite to the inner edge may be secured to the groove. The upper and lower surface of the thermal protection element may be hardened. A "hardened" surface provides increased durability for a ceramic tile.

The durability may be provided by a layer, such as a ceramic matrix composite that may be wrapped around a tile. In other advantageous embodiments, this hardened layer also may be hardened through curing and sintering. Both may be employed in providing hardening for a thermal protection element. In some advantageous embodiments, the upper and lower surface may include a ceramic matrix composite layer that is hardened along with, or in place of, the ceramic substrate.

Figure 3:
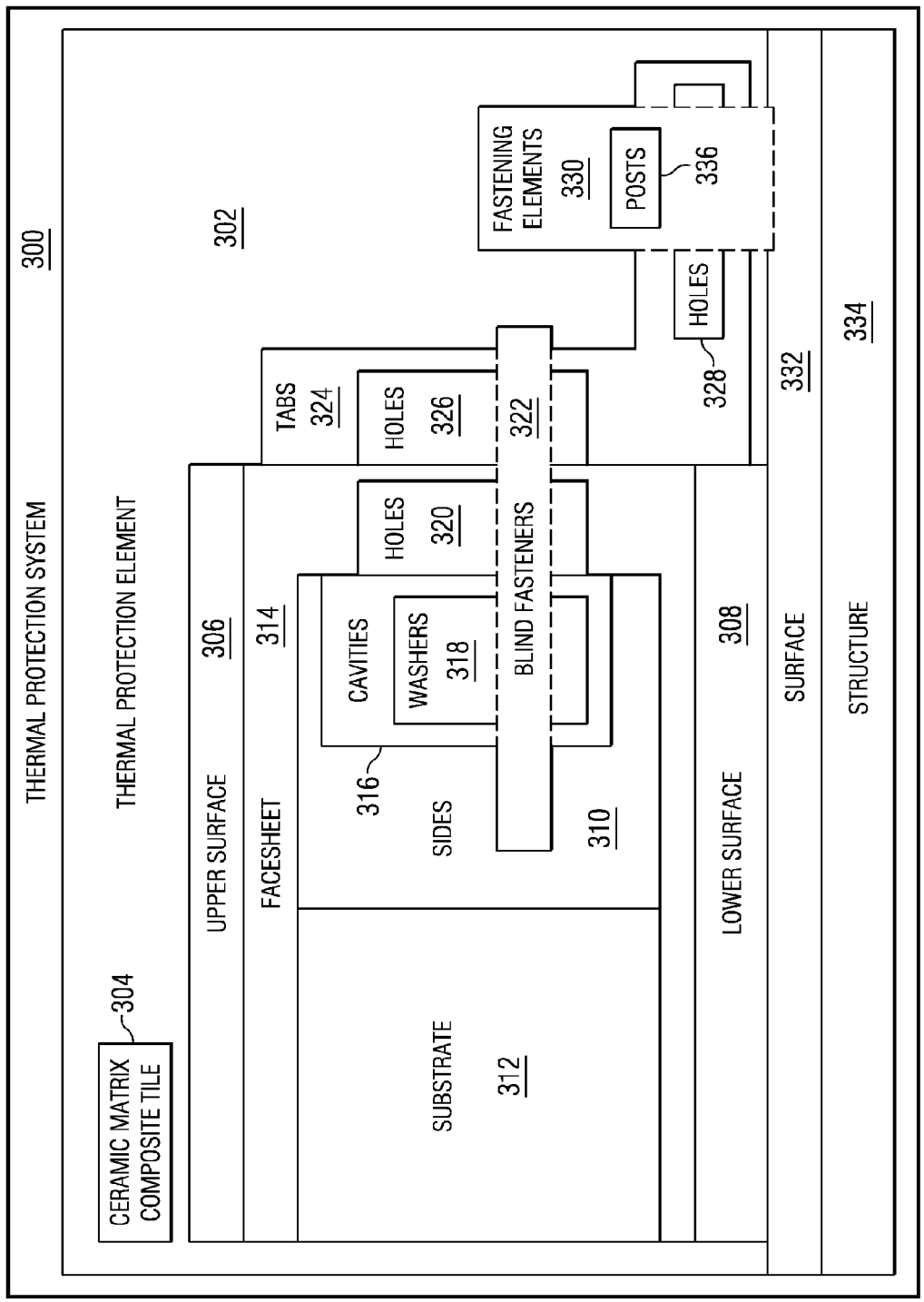
FIG. 3 is a diagram of a thermal protection system in accordance with an advantageous embodiment.

With reference now to FIG. 3, a diagram of a thermal protection system is depicted in accordance with an advantageous embodiment. Thermal protection system 300 is an example of a thermal protection system such as, for example, thermal protection system 216 in spacecraft 200 in FIG. 2.

In this example, thermal protection system 300 includes thermal protection element 302. Thermal protection element 302 may be any element or structure capable of providing thermal protection. In other words, thermal protection element 302 may protect a surface from heat and/or cold. Thermal protection element 302 may take the form of ceramic matrix composite tile 304. Of course, thermal protection element 302 may also be implemented using other types of ceramics or materials, depending on the particular implementation. Thermal protection element 302 may be comprised of a single substrate, layers of materials, blends of materials, or some other suitable material or combination of materials.

In these illustrative examples, thermal protection element 302 may have substrate 312 and facesheet 314. Facesheet 314 is a layer of material that may cover substrate 312. This layer of material may be a single layer and/or a laminate. Substrate 312 may be comprised of a single material or multiple materials, and/or may have layers or different structures or substructures. Facesheet 314 may be made of ceramic, a ceramic matrix composite material, and/or some other suitable material. Facesheet 314 may be used to provide a strengthened exterior that may increase damage resistance to impacts that may occur.

Thermal protection element 302 may have upper surface 306 opposite of lower surface 308. Sides 310 are located between upper surface 306 and lower surface 308. In these illustrative examples, cavities 316 are located within sides 310 under facesheet 314. Washers 318 may be located within cavities 316 in these examples. Washers 318 also may be comprised of a ceramic matrix composite material.

Facesheet 314 has holes 320, which may be in communication with washers 318 and cavities 316. In these examples, blind fasteners 322 may secure tabs 324 to thermal protection element 302. More specifically, blind fasteners 322 may be secured to washers 318 and facesheet 314 in these illustrative examples. Blind fasteners 322 may be placed through holes 320, washers 318, holes 326 in tabs 324 and secured. Washers 318 may be unnecessary if facesheet 314 has sufficient rigidity to allow tabs 324 to be secured in holes 326 using blind fasteners 322.

In these examples, blind fasteners 322 may be, for example, blind rivets. Of course, any fastener may be used that may be capable of being fastened when only one side of the object is accessible for securing a fastener.

Tabs 324, with or without holes 328, are capable of being secured to fastening elements 330 secured to surface 332 of structure 334. Fastening elements 330 may take various forms. For example, fastening elements 330 may be posts 336 secured to surface 332 of structure 334. Structure 334 may take various forms. For example, structure 334 may be a structural element on which a skin of the spacecraft is secured.

Figure 4:
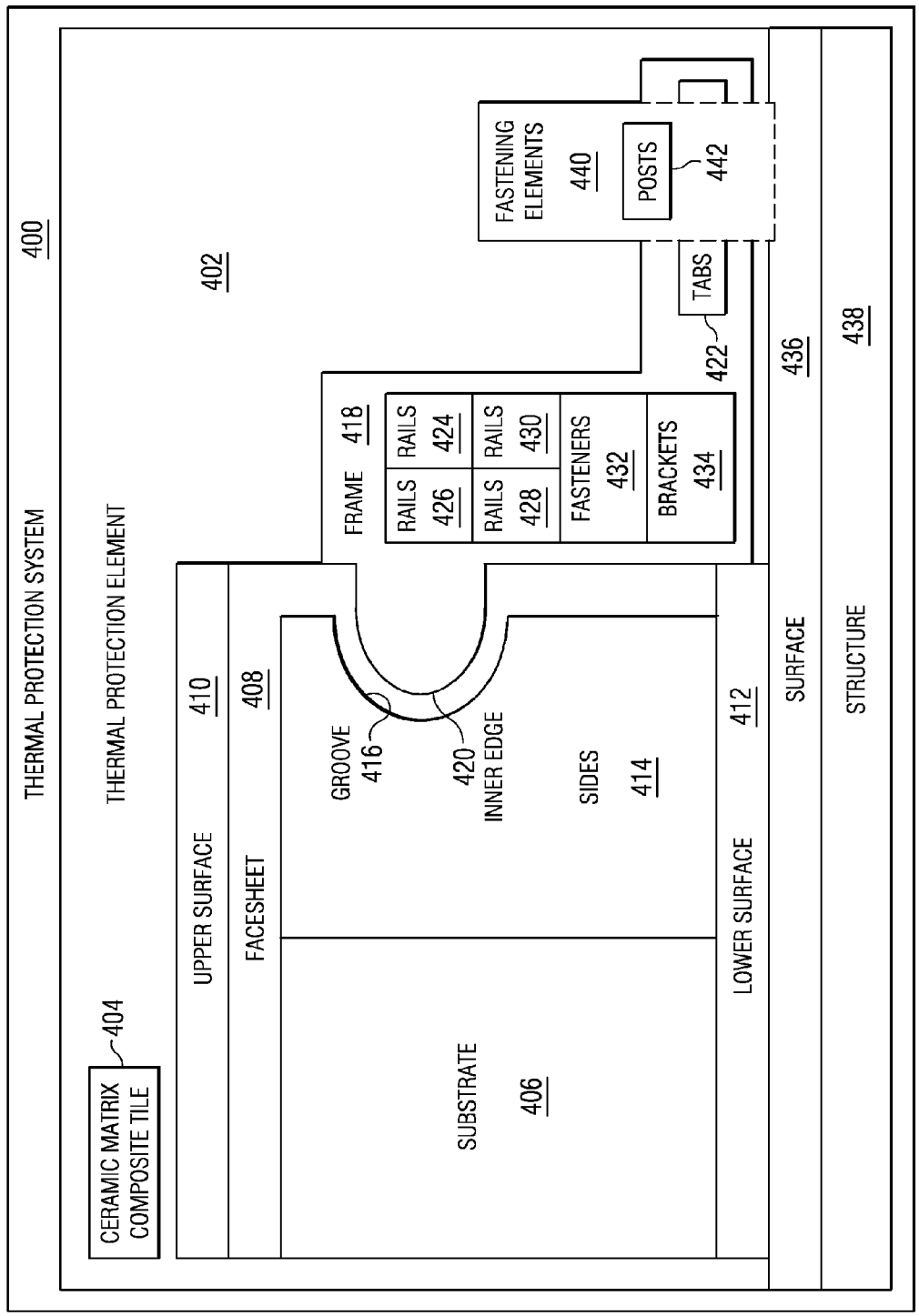
FIG. 4 is a diagram illustrating a thermal protection system in accordance with an advantageous embodiment.

Next, in FIG. 4, a diagram illustrating a thermal protection system is depicted in accordance with an advantageous embodiment. Thermal protection system 400 is an example of a thermal protection system such as, for example, thermal protection system 216 for spacecraft 200 in FIG. 2.

In this example, thermal protection system 400 may include thermal protection element 402. Thermal protection element 402 may be, for example, ceramic matrix composite tile 404. Ceramic matrix composite tile 404 may be substrate 406 that is wrapped with facesheet 408. Facesheet 408 may be wrapped around substrate 406 and cured and sintered to form ceramic matrix composite tile 404. Substrate 406 may be, for example, without limitation, a ceramic material and/or some other suitable material. Facesheet 408 may be, for example, without limitation, a ceramic matrix composite. Thermal protection element 402 may be comprised of substrate 406 and facesheet 408.

Thermal protection element 402 has upper surface 410 opposite of lower surface 412. Sides 414 are located between upper surface 410 and lower surface 412. Facesheet 408 may cover at least a portion of thermal protection element 402.

In this illustrative example, groove 416 is formed in sides 414. Frame 418 has inner edge 420 and tabs 422. Inner edge 420 is configured to engage groove 416 when frame 418 is secured to thermal protection element 402.

Facesheet 408 may conform to groove 416, and inner edge 420 may engage facesheet 408 in groove 416. Tabs 422 are located opposite of inner edge 420. Frame 418 may be formed from rails 424, 426, 428, and 430. These rails may be joined to secure frame 418 to groove 416. Rails 424, 426, 428, and 430 may use fasteners 432 and brackets 434. Frame 418 may be secured to groove 416 with a compressive load.

Thermal protection element 402 may be secured to surface 436 of structure 438 by securing tabs 422 to fastening elements 440 located on surface 436 of structure 438. Structure 438 may be, for example, a structural element on a spacecraft. Fastening elements 440 may be, for example, posts 442. Tabs 422 are configured such that they can be secured to posts 442 in these examples.

In this manner, the thermal protection systems illustrated in FIGS. 3 and 4 may provide a capability to attach thermal protection elements to a surface of a structure in a manner that reduces the weight of a system. For example, the different advantageous embodiments may not require a carrier plate to mount the tile. Instead, the different advantageous embodiments provide mounting structures for the thermal protection elements.

The illustrations of thermal protection system 300 in FIG. 3 and thermal protection system 400 in FIG. 4 are not meant to imply physical or architectural limitations to the manner in which different advantageous embodiments may be implemented. Other components may be used in addition to, or in place of, the ones illustrated in some advantageous embodiments. In yet other advantageous embodiments, some of the illustrated components may be unnecessary.

For example, in some advantageous embodiments, posts 336 and posts 442 may be unnecessary. Instead, tabs 324 and tabs 422 may be secured directly to surface 332 of structure 334 and surface 436 of structure 438 using a fastener. In yet other advantageous embodiments, the thermal protection system may include additional thermal protection elements rather than the single ones illustrated for each thermal protection system. In still other advantageous embodiments, the thermal protection elements may be made of other types of materials other than a ceramic matrix composite, including, for example, without limitation, metal matrix composites and monolithic ceramics. As a further example, some substrates may have additional cavities or may be hollow.

The different fastening components such as, for example, without limitation, tabs, frames, washers, blind fasteners, and other suitable components may be made of various materials. In these different illustrative examples, these components may be made of a monolithic composite, ceramic composite, and/or a metal. The metal may be, for example, without limitation, titanium, steel, high temperature alloys, and/or some other metal suitable for use with thermal protection systems. When selecting materials for this system, the compatibility of coefficients of thermal expansion (CTEs) and temperature limitations for the different materials may be considered.

Figure 5:
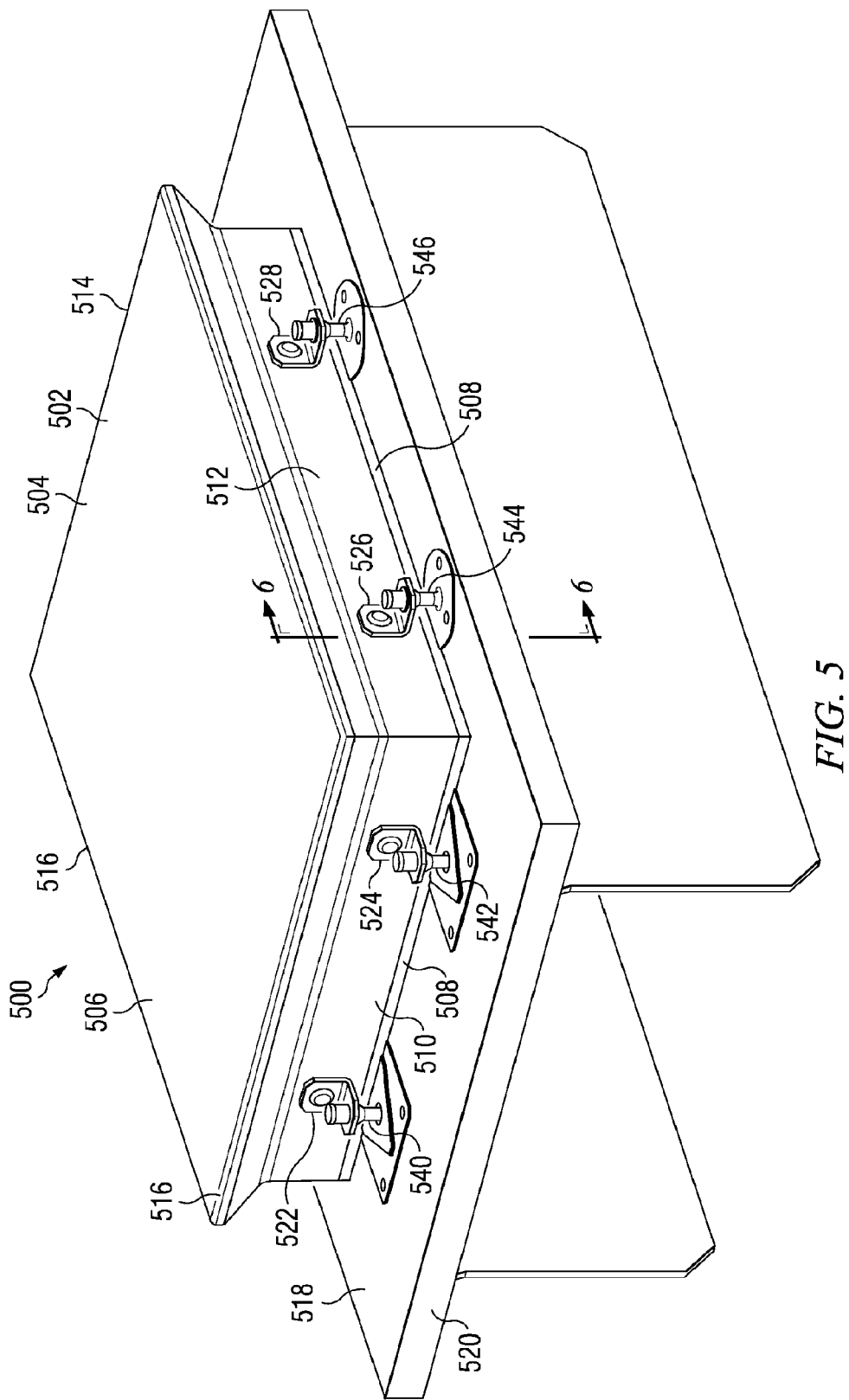
FIG. 5 is a diagram of a thermal protection system in accordance with an advantageous embodiment.

With reference now to FIG. 5, a diagram of a thermal protection system is depicted in accordance with an advantageous embodiment. In this illustrative example, thermal protection system 500 is an example of one implementation for thermal protection system 300 in FIG. 3. In this illustrative example, thermal protection element 502 takes the form of ceramic matrix composite tile 504.

In this example, ceramic matrix composite tile 504 has upper surface 506 and lower surface 508. Sides 510, 512, 514, and 516 are present between upper surface 506 and lower surface 508. These sides and/or surfaces may not be parallel or substantially parallel to each other depending on the shape of the ceramic matrix composite tile. In this illustrative example, lower surface 508 of ceramic matrix composite tile 504 is secured to surface 518 of structure 520.

Tabs 522 and 524 are attached to side 510, while tabs 526 and 528 are attached to side 512. Additional tabs are present on sides 514 and 516 but are not seen in this view. These tabs may be secured to ceramic matrix composite tile 504 using blind rivets and washers. Posts 540-546 are secured to surface 518 of structure 520 in this view. Tabs 522-528 may be secured to posts 540-546. In these illustrative examples, the tabs and posts may be made of stainless steel and/or titanium.

Figure 6:
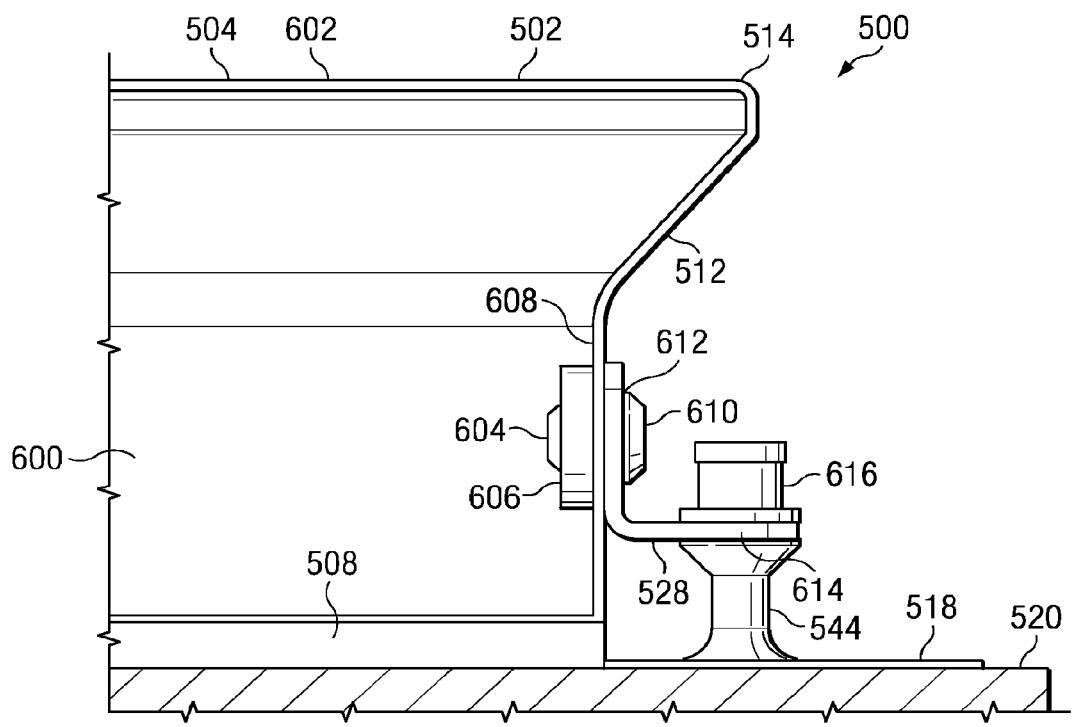
FIG. 6 is a cross-sectional view of a ceramic matrix composite tile in accordance with an advantageous embodiment.

With reference now to FIG. 6, a cross-sectional view of a ceramic matrix composite tile is depicted in accordance with an advantageous embodiment. In this example, a partial cross-sectional view of ceramic matrix composite tile 504 is depicted in accordance with an advantageous embodiment. This cross-sectional view is taken along lines 6-6 in FIG. 5.

In this partial cross-sectional view, ceramic matrix composite tile 504 is comprised of substrate 600 and facesheet 602. Substrate 600 may be comprised of a ceramic material. Facesheet 602 may be comprised of a ceramic composite material. In some advantageous embodiments, substrate 600 also may be comprised of a ceramic matrix composite material and, in some embodiments, facesheet 602 may be comprised of a ceramic material. Of course, any material suitable for use in protecting a surface against heat may be used.

Additionally, substrate 600 has cavity 604 formed within substrate 600. Cavity 604 may be formed when ceramic matrix composite tile 504 is formed. In other advantageous embodiments, cavity 604 may be drilled and/or bored out of side 512. Washer 606 is located within cavity 604 on inner side 608 of facesheet 602. Cavity 604 may have a configuration and size to contain washer 606 and have additional clearance to receive blind rivet 610. Washer 606 also may be comprised of a ceramic matrix composite material. Washer 606 may be placed within cavity 604 and facesheet 602 placed over substrate 600. Washer 606 and facesheet 602 may be cured to form ceramic matrix composite tile 504.

In the illustrative example, washer 606 may be made from a ceramic matrix composite. Washer 606 may be around 5/8 inches in diameter and around 1/8 inch thick in this example. Of course, other dimensions may be used, depending on the particular implementation. Cavity 604 may be machined to the same depth as washer 606 with a slightly larger diameter to allow for installation of washer 606.

Facesheet 602 may be formed from around four plies of a ceramic matrix composite material. Facesheet 602 may be around 0.040 inches thick in these examples. Of course, other thicknesses and numbers of plies may be used, depending on the particular implementation.

Blind rivet 610 may be placed through hole 612 in tab 528 and through washer 606 to secure tab 528 to thermal protection element 502. Blind rivet 610 may be made of various materials. For example, without limitation, blind rivet 610 may be made of steel, titanium, a high-temperature alloy, and/or some other suitable material. In this illustrative example, tab 528 is capable of being secured to post 544.

In this illustrative example, tab 528 may be secured to post 544 using nut 616. Post 544 may be coupled to hole 614 in tab 528. By securing tab 528 to post 544, thermal protection element 502 may be secured to structure 520. In these illustrative examples, a composi-loc II rivet may be used. This rivet may be available from Monogram Aerospace Fasteners Company. Of course, any type of rivet may be used for blind rivet 610 that may have a controlled pre-load that does not crush washer 606 and facesheet 602.

Although washer 606 is illustrated in these examples, washer 606 may be unnecessary in some advantageous embodiments. If facesheet 602 has sufficient strength to hold blind rivet 610 and tab 528, washer 606 may be omitted. With this type of implementation, locations in which blind fasteners are to be secured to facesheet 602 may be reinforced. For example, these locations may be reinforced using a material such as, for example, a ceramic matrix composite material, a ceramic, a metal, and/or some other suitable material. Further, in some advantageous embodiments, both washers and reinforcements of facesheet 602 may be used.

Figure 7:
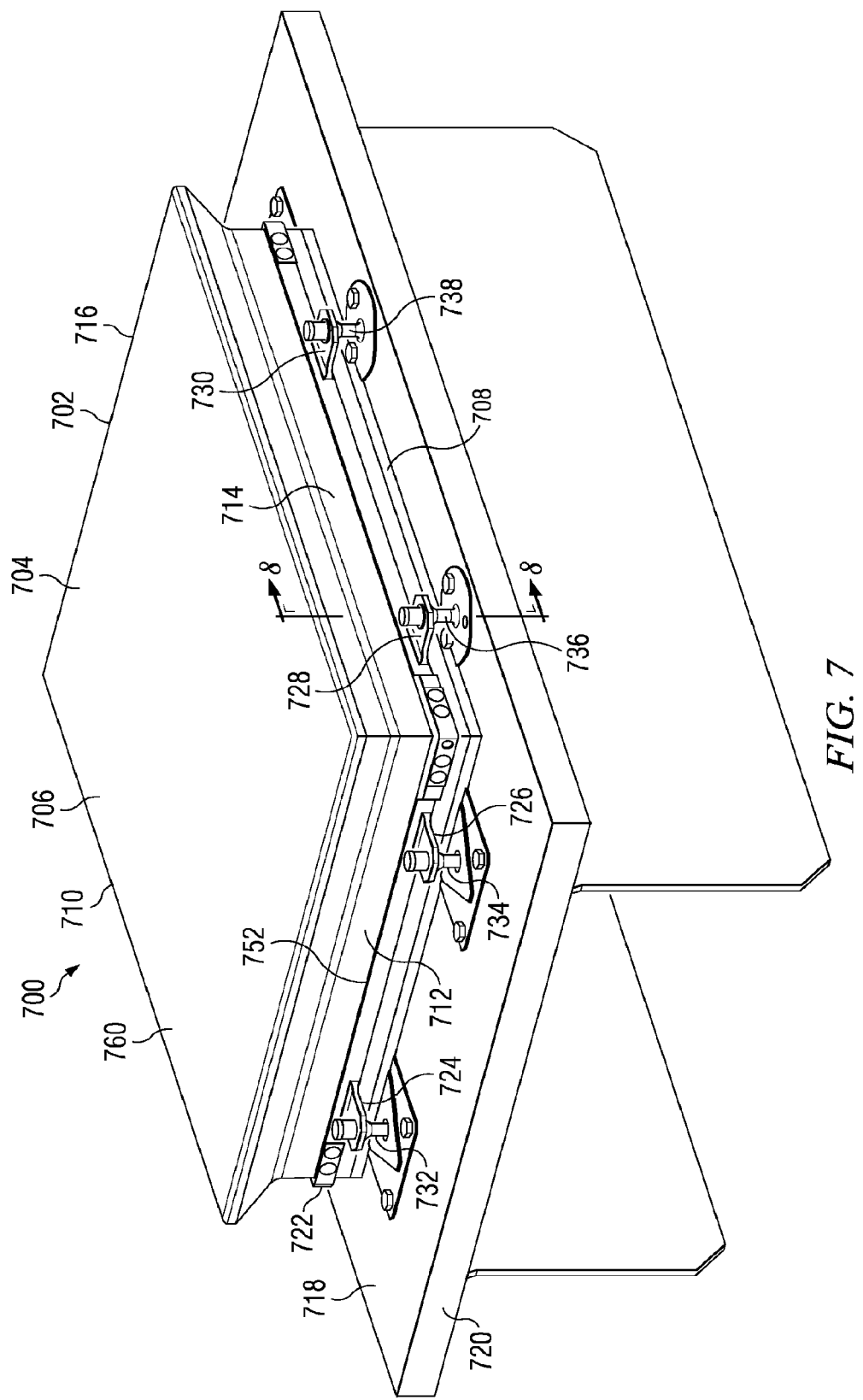
FIG. 7 is a diagram of a thermal protection system in accordance with an advantageous embodiment.

With reference now to FIG. 7, a diagram of a thermal protection system is depicted in accordance with an advantageous embodiment. Thermal protection system 700 is an example of one implementation of thermal protection system 400 in FIG. 4. In this illustrative example, thermal protection element 702 may take the form of ceramic matrix composite tile 704.

Ceramic matrix composite tile 704 has upper surface 706 and lower surface 708. Additionally, ceramic matrix composite tile 704 has sides 710, 712, 714, and 716. Lower surface 708 may be secured to surface 718 of structure 720. Frame 722 is secured to sides 710, 712, 714, and 716. Frame 722 may be constructed from various materials. For example, without limitation, frame 722 may be constructed from titanium.

Frame 722 has tabs 724, 726, 728, and 730. Tabs 724 and 726 are located on side 712, while tabs 728 and 730 are located on side 714. Additional tabs are present on frame 722 on sides 710 and 716 but not seen in this view.

Posts 732, 734, 736, and 738 are secured to surface 718 of structure 720. Tabs 724, 726, 728, and 730 may be secured to posts 732, 734, 736, and 738, respectively.

Figure 8:
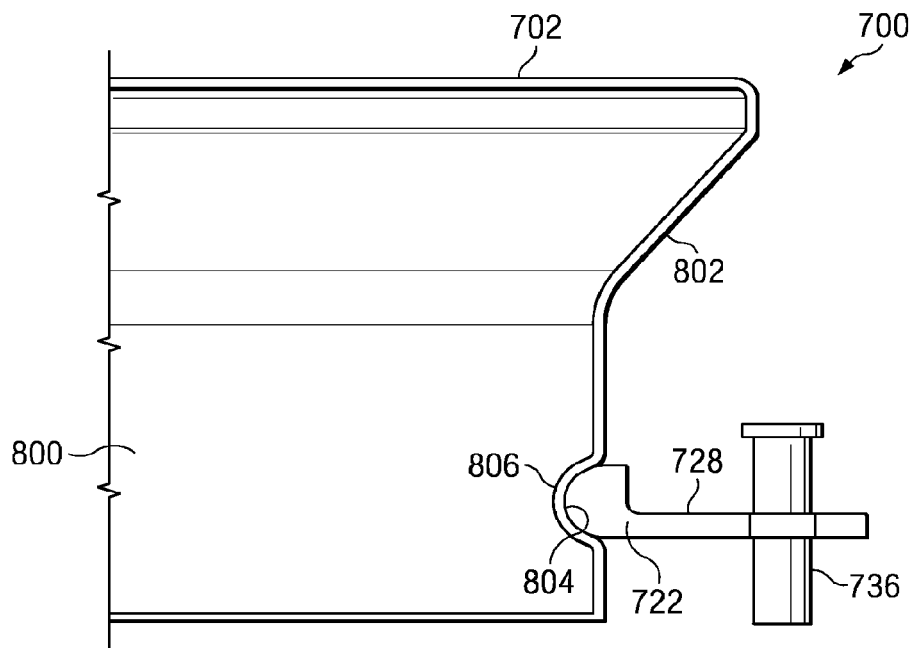
FIG. 8 is a partial cross-sectional side view of a thermal protection element in accordance with an advantageous embodiment.

With reference now to FIG. 8, a partial cross-sectional side view of a thermal protection element is depicted in accordance with an advantageous embodiment. In this example, the partial cross-sectional side view is taken along lines 8-8 in FIG. 7. In this example, thermal protection element 702 has substrate 800 and facesheet 802. As can be seen in this example, inner edge 804 of frame 722 fits into groove 806 in thermal protection element 702.

In this example, groove 806 is substantially cylindrical, and inner edge 804 has a cylindrical shape that fits within groove 806. This cylindrical shape may reduce shear and tension on facesheet 802. Of course, other shapes for inner edge 804 and groove 806 may be used, depending on the particular implementation.

Figure 9:
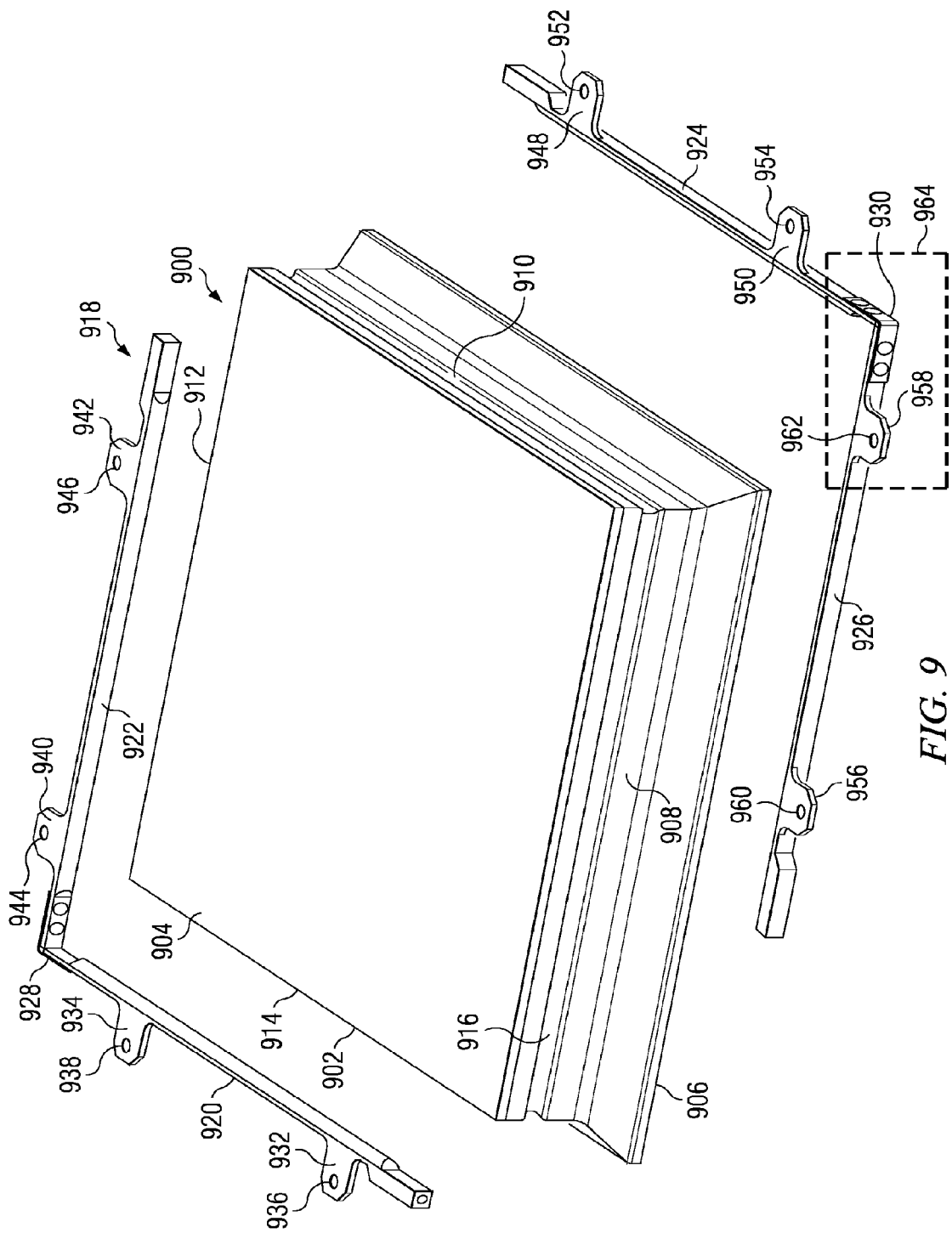
FIG. 9 is a diagram illustrating an unassembled frame for a thermal protection element in accordance with an advantageous embodiment.

Turning to FIG. 9, a diagram illustrating an unassembled frame for a thermal protection element is depicted in accordance with an advantageous embodiment. In this example, thermal protection element 900 takes the form of ceramic matrix composite tile 902. Ceramic matrix composite tile 902 has lower surface 904 and upper surface 906. In this illustrative example, ceramic matrix composite tile 902 is shown in an upside down view with lower surface 904 facing upwards. Ceramic matrix composite tile 902 also has sides 908, 910, 912, and 914 located between lower surface 904 and upper surface 906. Groove 916 is formed along sides 908, 910, 912, and 914.

In this example, frame 918 is comprised of rails 920, 922, 924, and 926. Rails 920 and 922 are joined to each other by bracket 928, while rail 924 and rail 926 are joined to each other by bracket 930. Rail 920 has tabs 932 and 934 with holes 936 and 938. Rail 922 has tabs 940 and 942 with holes 944 and 946. Rail 924 has tabs 948 and 950 with holes 952 and 954. Rail 926 has tabs 956 and 958 with holes 960 and 962.

Figure 10:
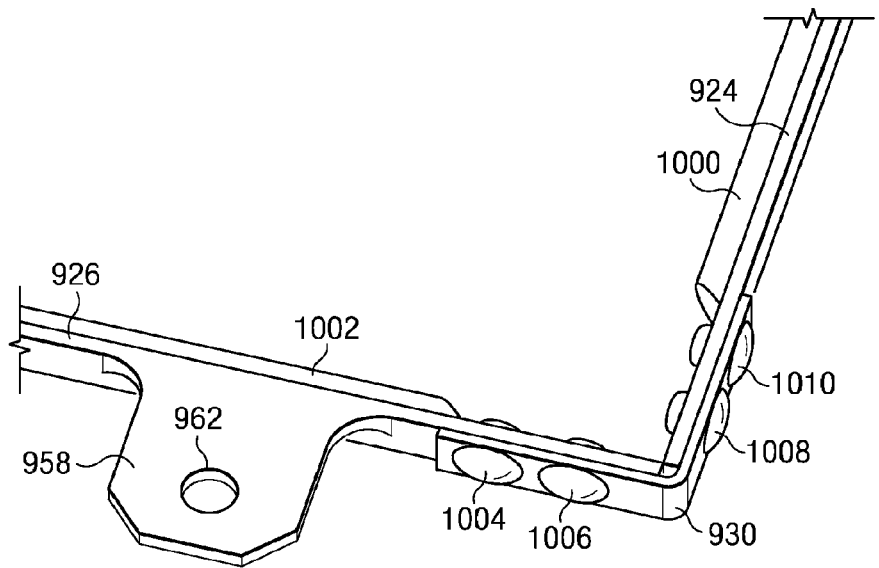
FIG. 10 is a magnified view of a portion of a frame in accordance with an advantageous embodiment.

With reference to FIG. 10, a magnified view of a portion of a frame is depicted in accordance with an advantageous embodiment. In this illustrative example, a more detailed view of section 964 from FIG. 9 is illustrated.

As can be seen in this illustration, rail 924 and rail 926 of frame 918 have inner edge 1000 and inner edge 1002. Rail 924 is secured to rail 926 through bracket 930. Rivets 1004, 1006, 1008, and 1010 are used to secure rails 926 and 924 to bracket 930.

Figure 11:
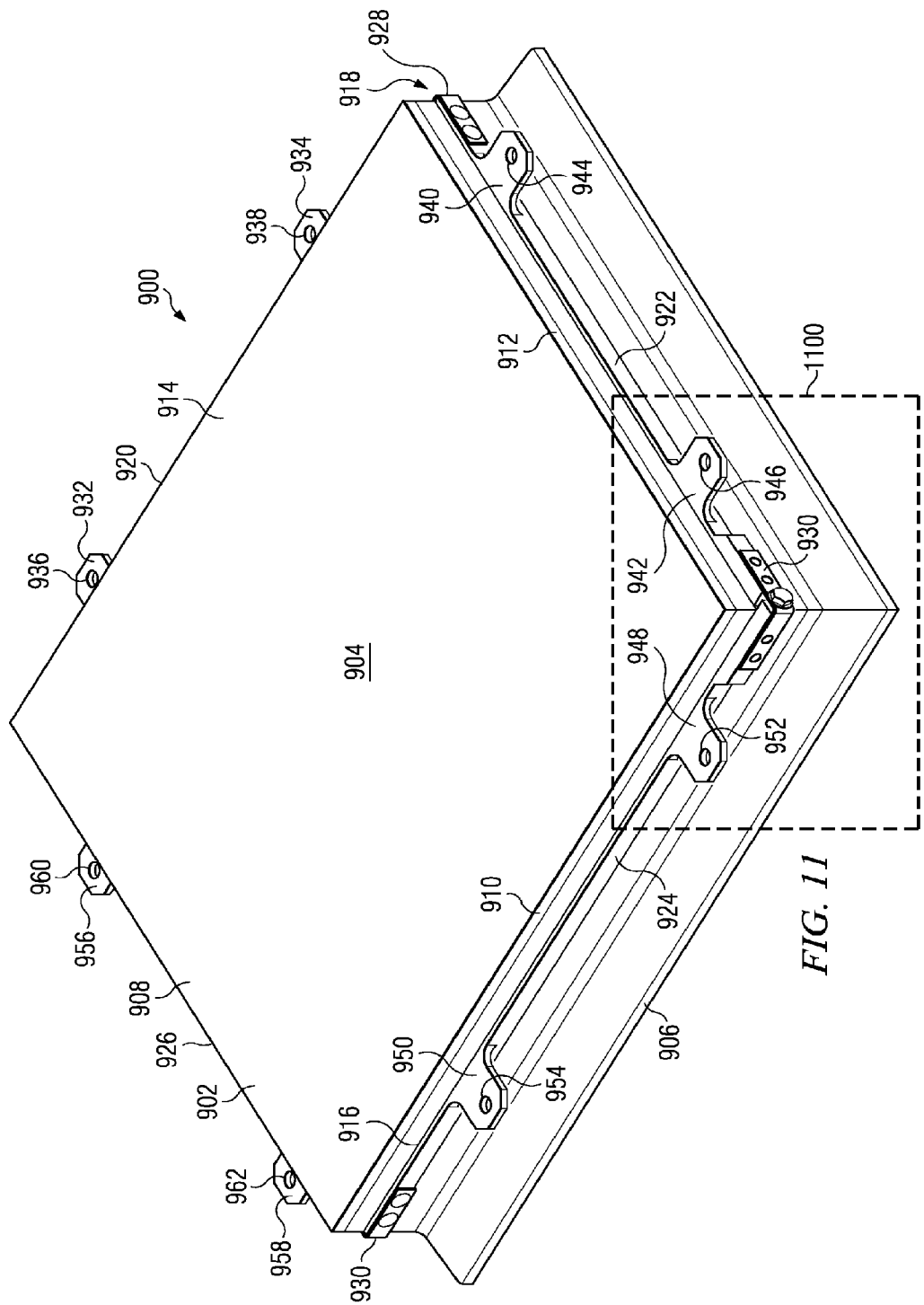
FIG. 11 is a diagram of an assembled frame around a ceramic matrix composite tile in accordance with an advantageous embodiment.

In FIG. 11, a diagram of an assembled frame around a ceramic matrix composite tile is depicted in accordance with an advantageous embodiment.

Figure 12:
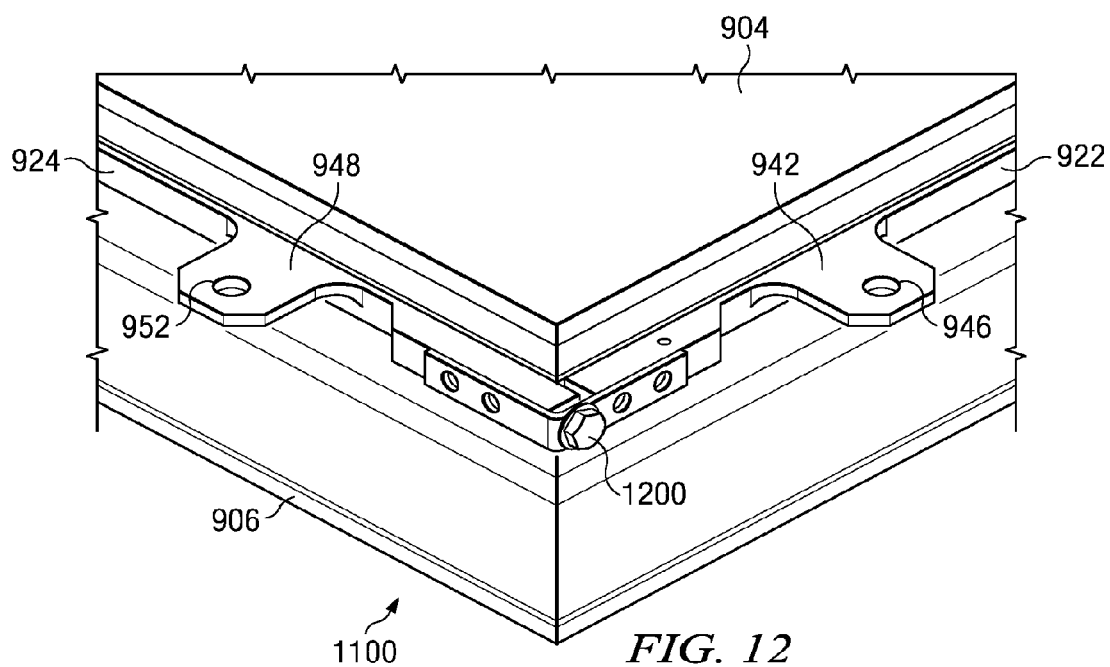
FIG. 12 is a magnified view of a portion of an assembled frame on a ceramic matrix composite tile in accordance with an advantageous embodiment.

With reference to FIG. 12, a magnified view of a portion of an assembled frame on a ceramic matrix composite tile is depicted in accordance with an advantageous embodiment. In this example, a more detailed view of section 1100 in FIG. 11 is illustrated.

As can be seen in this view, screw 1200 may be placed into frame 918 to pre-load or put a compressive load on ceramic matrix composite tile 902. In this manner, frame 918 may place a compressive pre-load on ceramic matrix composite tile 902.

Figure 13:
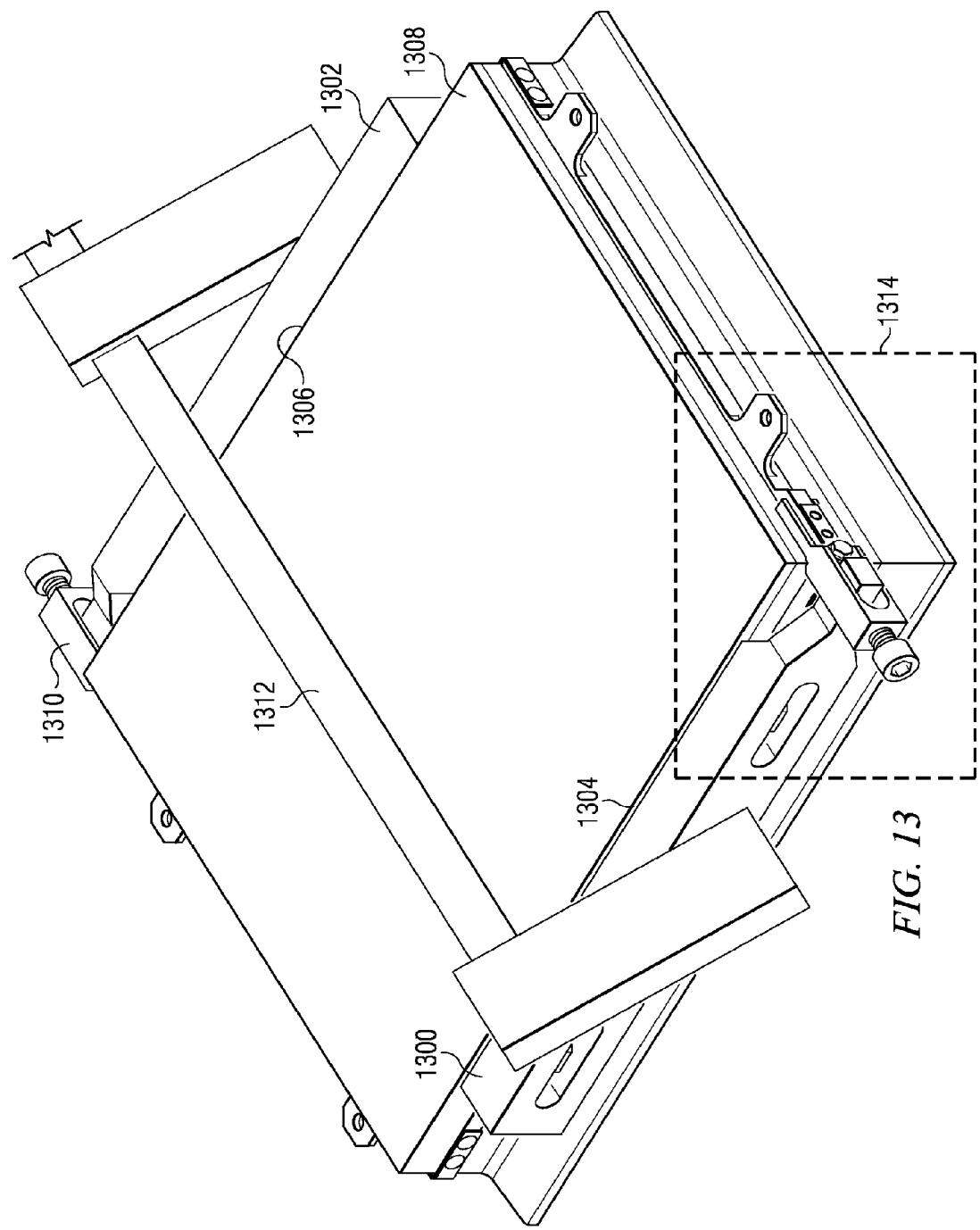
FIG. 13 is a diagram illustrating installation of a frame in accordance with an advantageous embodiment.

With reference now to FIG. 13, a diagram illustrating installation of a frame is depicted in accordance with an advantageous embodiment. In this example, blocks 1300 and 1302 may be placed on sides 1304 and 1306 of ceramic matrix composite tile 1308 with frame 1310 in place. Grip mechanism 1312 may hold blocks 1302 and 1304 in place. Section 1314 is shown in more detail in FIG. 14 below.

Figure 14:
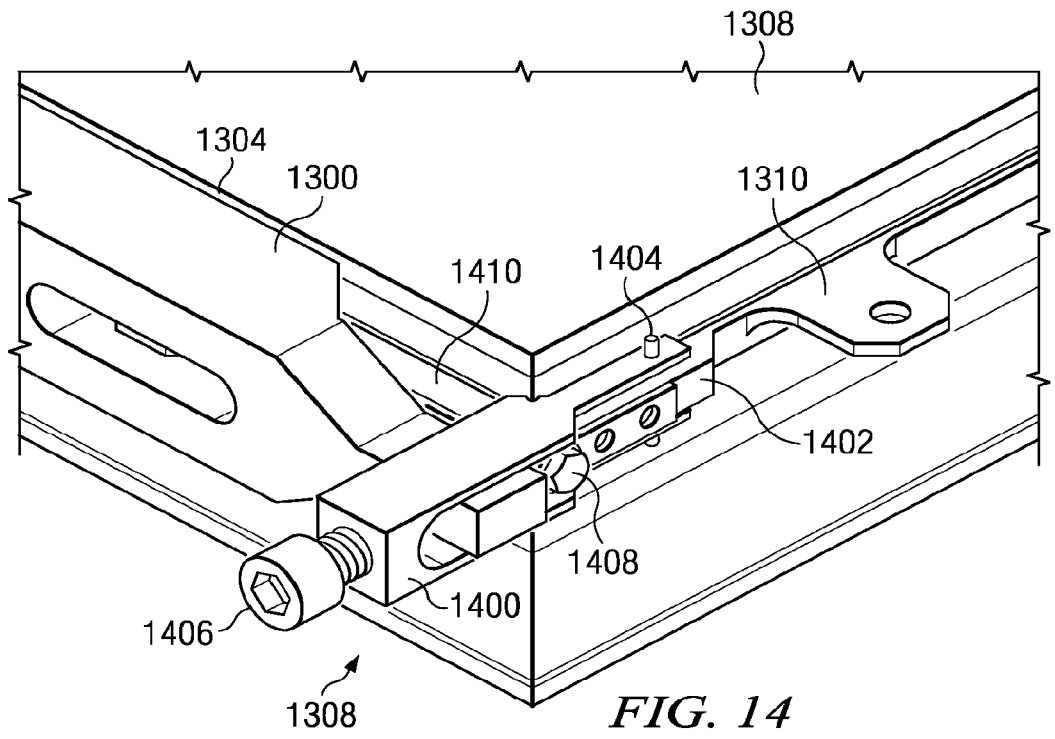
FIG. 14 is a diagram illustrating a magnified portion of a ceramic matrix composite tile with a frame in accordance with an advantageous embodiment.

Next, in FIG. 14, a diagram illustrating a magnified portion of a ceramic matrix composite tile with a frame is depicted in accordance with an advantageous embodiment. In this more detailed view of section 1314, clevis 1400 may be attached to rail 1402 of frame 1310 by pin 1404. Screw 1406 may turn and place pressure on block 1300 in a manner that induces a tensile load on frame 1310 and a compressive load on ceramic matrix composite tile 1308. Screw 1408 may be used to secure rail 1402 to rail 1410. Screw 1408 also may be used to create a tensile load on frame 1310 and a compressive load on ceramic matrix composite tile 1308.

Figure 15:
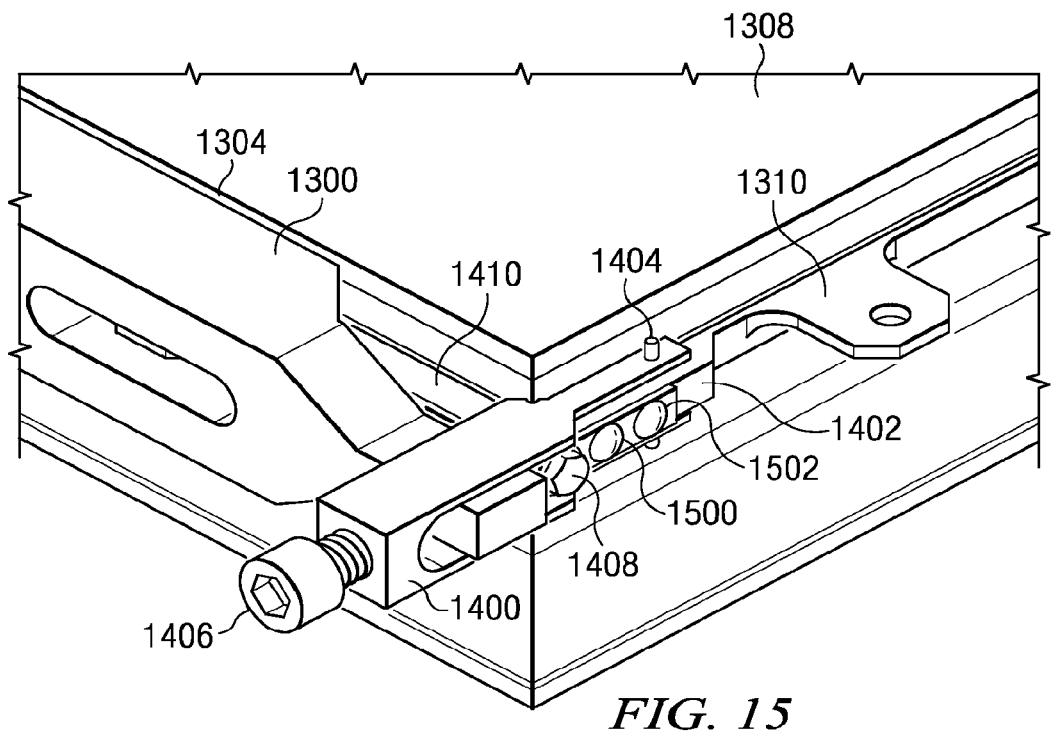
FIG. 15 is a diagram illustrating installation of rivets in a frame in accordance with an advantageous embodiment.

Next, in FIG. 15, a diagram illustrating installation of rivets in a frame is depicted in accordance with an advantageous embodiment. In this example, rivets 1500 and 1502 may be installed after rail 1402 has been aligned with rail 1410 with the desired amount of force.

Figure 16:
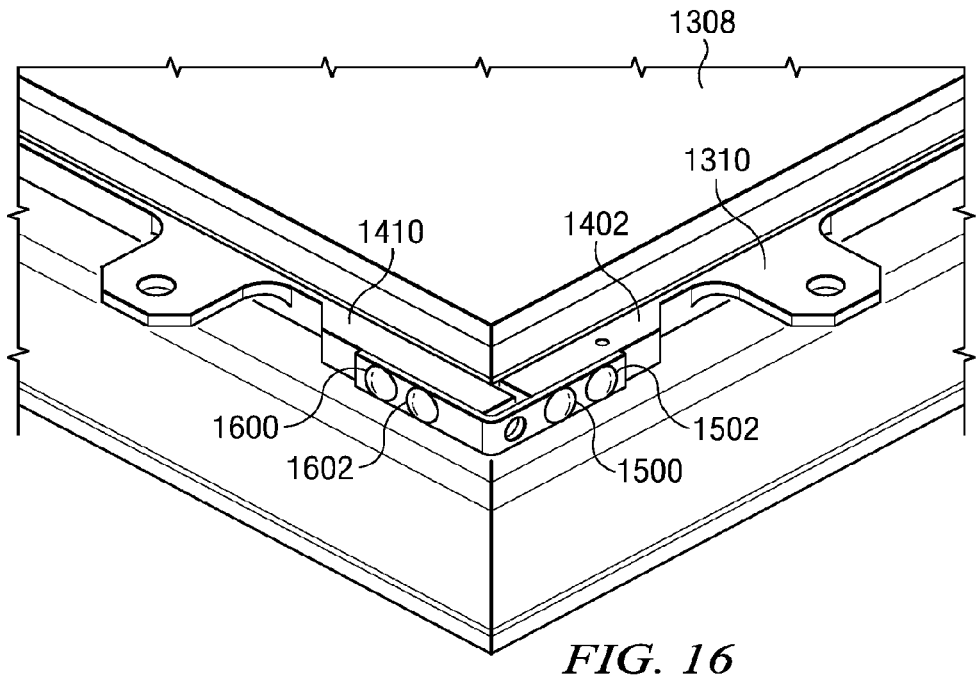
FIG. 16 is a diagram illustrating a completed assembly of a portion of a frame in accordance with an advantageous embodiment.

With reference now to FIG. 16, a diagram illustrating a completed assembly of a portion of a frame is depicted in accordance with an advantageous embodiment. In this example, after rivets 1500 and 1502 have been installed, clevis 1400 (not shown) and block 1300 (not shown) may be removed. Thereafter, rivets 1600 and 1602 may be installed and screw 1408 removed to complete installation or securing of rail 1402 to rail 1410.

Figure 17:
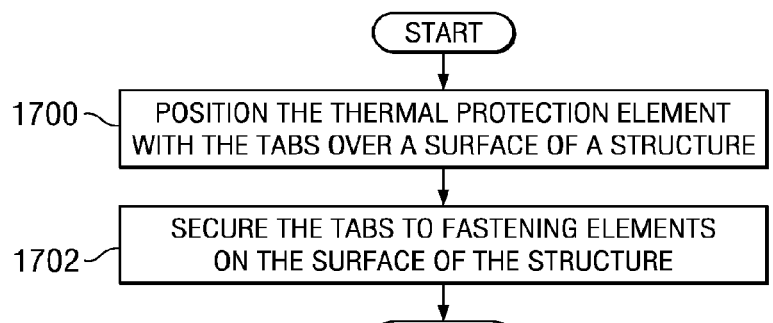
FIG. 17 is a flowchart of a process for securing a thermal protection element to a structure in accordance with an advantageous embodiment.

Turning now to FIG. 17, a flowchart of a process for securing a thermal protection element to a structure is depicted in accordance with an advantageous embodiment. This process may be implemented using thermal protection system 300 in FIG. 3 or thermal protection system 400 in FIG. 4.

The process begins by positioning the thermal protection element with the tabs over a surface of a structure (operation 1700). The thermal protection element may be, for example, thermal protection element 302 in FIG. 3. The tabs may be secured to fastening elements on the surface of the structure (operation 1702), with the process terminating thereafter.

Figure 18:
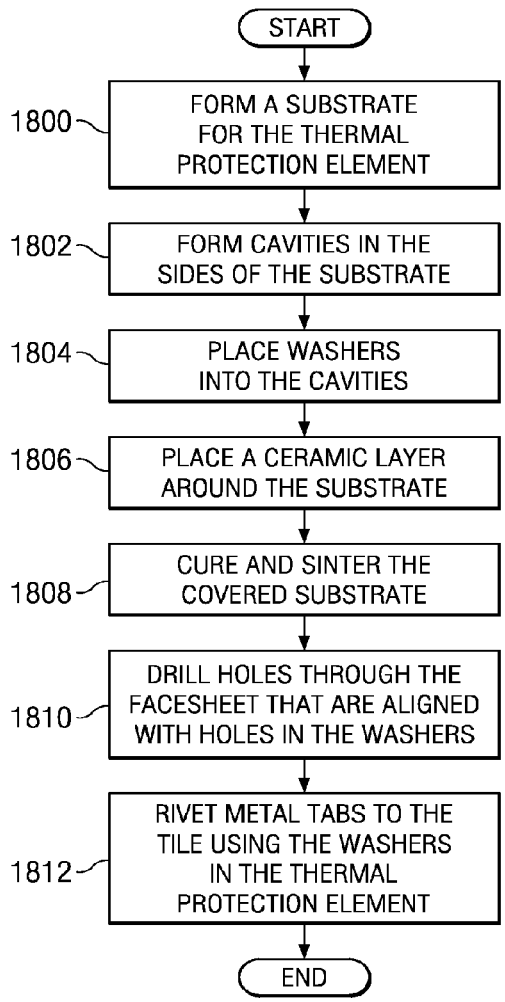
FIG. 18 is a flowchart of a process for manufacturing a thermal protection element in accordance with an advantageous embodiment.

With reference now to FIG. 18, a flowchart of a process for manufacturing a thermal protection element is depicted in accordance with an advantageous embodiment. The process illustrated in FIG. 18 may be used to manufacture a thermal protection element such as, for example, thermal protection element 302 in FIG. 3.

The process begins by forming a substrate for the thermal protection element (operation 1800). Next, cavities are formed in the sides of the substrate (operation 1802). These cavities may be formed by drilling and/or machining in these examples. Washers are placed into the cavities (operation 1804). These washers may be constructed from ceramic matrix composite laminates.

A ceramic layer is placed around the substrate (operation 1806). This layer may be formed from a ceramic matrix composite material. The layer may be a facesheet or a ceramic layer for the thermal protection element. The covered substrate is cured and sintered (operation 1808). This curing may be performed in an autoclave, depending on the particular implementation. The sintering may be performed in a furnace.

Holes are drilled through the facesheet that are aligned with holes in the washers (operation 1810). Metal tabs are riveted to the tile using the washers in the thermal protection element (operation 1812), with the process terminating thereafter.

Figure 19:
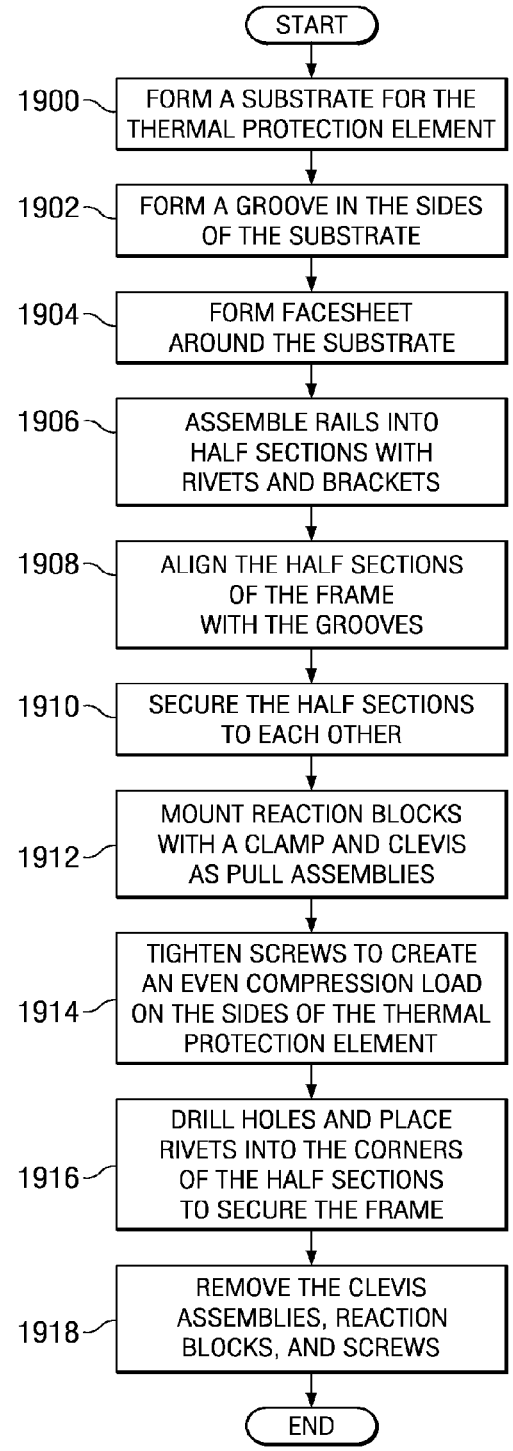
FIG. 19 is a flowchart of a process for manufacturing a thermal protection element in accordance with an advantageous embodiment.

With reference now to FIG. 19, a flowchart of a process for manufacturing a thermal protection element is depicted in accordance with an advantageous embodiment. The process illustrated in FIG. 19 may be implemented to manufacture a thermal protection element such as, for example, thermal protection element 402 in FIG. 4.

The process begins by forming a substrate for the thermal protection element (operation 1900). The process then forms a groove in the sides of the substrate (operation 1902). The groove may be machined or milled into the sides of the substrate. A facesheet may then be formed around the substrate (operation 1904). For example, the facesheet may be a ceramic matrix composite layer wrapped around the substrate.

The ceramic matrix composite layer may then be cured and sintered. The process assembles rails into half sections with rivets and brackets (operation 1906). In this example, each half section may be formed from two rails and a bracket. The half sections of the frame are aligned with the grooves (operation 1908). The half sections are then secured to each other (operation 1910).

Reaction blocks are mounted with a clamp and clevis as pull assemblies (operation 1912). Screws are tightened to create an even compression load on the sides of the thermal protection element (operation 1914). Holes are drilled and rivets are placed into the corners of the half sections to secure the frame (operation 1916). The clevis assemblies, reaction blocks, and screws are then removed (operation 1918), with the process terminating thereafter. The screws are no longer needed after the rivets are put in place.

The flowcharts and block diagrams in the different depicted embodiments illustrate the architecture, functionality, and operation of some possible implementations of apparatus and methods. In this regard, each block in the flowchart or block diagrams may represent a module, segment, operation, or portion of a component or process for implementing the specified number of functions and/or components. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

Thus, one or more of the different advantageous embodiments provide a method and apparatus for a thermal protection system. In the different illustrative examples, a thermal protection element is mechanically secured to a surface of a structure. In some of the illustrative examples, tabs are secured to the thermal protection element using washers located inside of the thermal protection element. In other advantageous embodiments, a rail with tabs is secured to a groove around the thermal protection element. One or more of the different advantageous embodiments may provide increased durability or load-bearing capability as compared to currently used ceramic tabs that are formed integrally as part of a ceramic tile.

With one or more of the different advantageous embodiments, a carrier plate may become unnecessary for mounting the thermal protection element to the surface of the structure. The different advantageous embodiments provide mounting elements, such as tabs, either secured to the thermal protection element through fasteners and/or rails for use in securing the thermal protection element to the surface of the structure.

Further, these different attachment mechanisms, as illustrated in the examples, may facilitate faster replacement of thermal protection elements as compared to currently available systems. Further, the tabs are able to withstand additional force normal to the tile as compared to currently used ceramic tabs formed integrally with a tile. For example, in some advantageous embodiments, the tabs are capable of carrying around 30 to around 50 pounds per linear inch of vertical load before failure.

The description of the different advantageous embodiments has been presented for purposes of illustration and description, and it is not intended to be exhaustive or limited to the embodiments in the form disclosed. Many modifications and variations will be apparent to those of ordinary skill in the art. Although the different advantageous embodiments have been described with respect to spacecraft, other advantageous embodiments may be applied to other types of objects.

For example, without limitation, other advantageous embodiments may be applied to a mobile platform, a stationary platform, a land-based structure, an aquatic-based structure, a space-based structure, and/or some other suitable object. More specifically, the different advantageous embodiments may be applied to, for example, without limitation, a spacecraft, a satellite, a space station, a rocket, an aircraft, a rover, an automobile, an engine, an engine structure, a building, and/or some other suitable object.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a thermal protection element that comprises a ceramic material and an upper surface, a lower surface, and a plurality of sides;
    a groove formed into the plurality of sides of the thermal protection element, such that the groove forms a single continuous depression that encompasses all of the plurality of sides and comprises a curved shape; and
    a frame comprising: four rails, each rail connected to two other rails of the four rails and respectively comprising an inner edge, and a number of tabs that extend away from the inner edge such that the inner edge of each rail comprises a shape that fills the groove such that the inner edge of each rail terminates before each end of each rail respectively such that a fastener is securable to an end of one rail and to an end of another rail.

2. The apparatus of claim 1 further comprising:
    a ceramic layer covering at least the plurality of sides of the thermal protection element, wherein the ceramic layer conforms to the groove and wherein the inner edge of each rail contacts the ceramic layer within the groove, and the curved shape controls a shear load and a tension load on the ceramic layer.

3. The apparatus of claim 1, wherein the frame comprises:
    the inner edge of each rail comprising a cylindrical shape;
    a number of brackets; and
    a number of rivets that secure the rails and the number of brackets.

4. The apparatus of claim 1, wherein the inner edge of each rail contacts the groove such that the inner edge of each rail applies a compressive load, toward a substrate within the thermal protection element, into the groove.

5. The apparatus of claim 1, wherein the thermal protection element covers an object selected from one of: a mobile platform, an aircraft, a tank, a personnel carrier, a train, a spacecraft, a submarine, a satellite, a rocket, an engine, an engine structure, and an automobile, and the lower surface of the thermal protection element secures directly to a surface of the object.

6. The apparatus of claim 1, further comprising the frame applying a compressive load toward a substrate within the thermal protection element.

7. The apparatus of claim 1, further comprising:
    the frame comprising an attachment point for a clevis that induces a tensile load on the frame; and
    each of the number of tabs configured to carry greater than 30 pounds per linear inch of vertical load before failure.

8. A method for securing a thermal protection element comprising a ceramic material to a structure, the method comprising:

positioning the thermal protection element with respect to a number of fastener elements on a surface of the structure, such that the thermal protection element comprises:
- a groove formed into a plurality of sides of the thermal protection element, such that the groove forms a single continuous depression that encompasses all of the plurality of sides and comprises a curved shape; and
- a frame comprising: four rails, each rail connected to two other rails of the four rails and respectively comprising an inner edge and a number of tabs that extend, away from the inner edge, the inner edge of each rail being secured to the groove via directly contacting the groove with a shape that conforms to and fills the groove; and securing the number of tabs to the number of fastener elements on the surface of the structure, such that the inner edge of each rail terminates before each end of each rail respectively such that each end of each rail is secured to a respective end of another rail using a fastener.

9. The method of claim 8 further comprising:
forming a substrate for the thermal protection element from a ceramic matrix composite material;
placing the inner edge of each rail in the groove; and
attaching the frame to the groove.

10. The method of claim 8 further comprising:
forming a facesheet over a substrate after forming the groove and prior to placing the inner edge of each rail in the groove.

11. The method of claim 10, further comprising the groove being shaped to control a shear force and a tension force on the facesheet.

12. The method of claim 8, further comprising the groove being cylindrical, and securing a lower surface of the thermal protection element directly to a surface of the structure.

13. The method of claim 8, further comprising attaching the frame to the groove via a clevis that induces a tensile load on the frame and a compressive load into a substrate within the thermal protection element.

14. A method for securing a thermal protection element comprising a ceramic material to a structure, the method comprising:
positioning the thermal protection element with respect to a number of fastener elements on a surface of the structure, such that the thermal protection element comprises:
- a groove formed into a plurality of sides of the thermal protection element, such that the groove forms a single continuous depression that encompasses all of the plurality of sides and comprises a curved shape; and
- a frame comprising: four rails, each rail connected to two other rails of the four rails and respectively comprising an inner edge and a number of tabs that extend, substantially perpendicular to a side of the plurality of sides, and away from the inner edge, the inner edge of each rail being secured to the groove via directly contacting the groove with a shape that conforms to and fills the groove;

securing a lower surface of the thermal protection element directly to a surface of the structure; and
securing the number of tabs to the number of fastener elements on the surface of the structure, such that the inner edge of each rail terminates before each end of each rail respectively such that each end of each rail is secured to a respective end of another rail using a fastener.

* * * * *